United States Patent [19]

Campbell

[11] Patent Number: 5,355,780

[45] Date of Patent: Oct. 18, 1994

[54] FLAME INHIBITING GRATE FOR A COOKING GRILL

[76] Inventor: Michael F. Campbell, R.R. #1, Box 133, Shelburn, Ind. 47879

[21] Appl. No.: 28,298

[22] Filed: Mar. 9, 1993

[51] Int. Cl.⁵ ............................................. A47J 37/00
[52] U.S. Cl. ........................................ 99/450; 99/447
[58] Field of Search ............... 99/444, 445, 447, 450; 126/41 R

[56] References Cited

U.S. PATENT DOCUMENTS

| | | | |
|---|---|---|---|
| 2,384,847 | 9/1945 | Perry | 99/450 |
| 2,884,849 | 5/1959 | Priem | 99/444 |
| 3,552,302 | 1/1971 | Gilberg | 99/444 |
| 3,570,469 | 3/1971 | Jones | 126/25 |
| 4,403,541 | 9/1983 | Berger | 99/385 |
| 4,598,634 | 7/1986 | Van Horn, II | 99/446 |
| 4,608,917 | 9/1986 | Faaborg | 99/446 |
| 4,658,710 | 4/1987 | Quet et al. | 99/450 |
| 4,703,746 | 11/1987 | Hitch | 126/25 |
| 4,862,795 | 9/1989 | Hawkins | 99/446 |
| 4,930,491 | 6/1990 | Purello | 126/332 |
| 4,936,202 | 6/1990 | Lin | 99/446 |
| 5,105,725 | 4/1992 | Haglund | 99/446 |

*Primary Examiner*—David A. Scherbel
*Assistant Examiner*—Reginald L. Alexander
*Attorney, Agent, or Firm*—Baker & Daniels

[57] ABSTRACT

The present invention relates to a grate for a cooking grill. The grill includes a heat source such as an open flame heat source or electric resistance-type heat source. The grate includes a plurality of support members, and a plurality of elongated rails disposed in spaced apart parallel relationship with each other and extending transversely to the support members. The spaces between the rails prevent flames from passing through the spaces. The flames may be produced, e.g., by the heat source and/or a grease fire.

21 Claims, 2 Drawing Sheets

FLAME INHIBITING GRATE FOR A COOKING GRILL

BACKGROUND OF THE INVENTION

1. Field of the Invention.

The present invention relates to cooking grills, and, more particularly, to cooking grills having a grate for supporting food.

2. Description of the Related Art.

Cooking grills of conventional design typically include a grate having a plurality of rails disposed in parallel relationship to each other over a heat source. The heat source may be, e.g., an open flame or electric resistance-type heat source. The rails may have a rectangular or circular cross sectional shape. The spacing between the rails is sufficiently close to allow proper support of the food to be cooked, e.g., steaks or chops, and sufficiently large to allow heat, smoke, flames and grease to pass therethrough.

A problem with conventional grates is that the spacing between the parallel rails is large enough to allow flames from an open flame heat source or grease fire to pass through the grate and directly contact the food being cooked. Direct contact of the flames with the food results in scorching or blackening of the food being cooked, which may be undesirable.

Another problem with conventional grates is that the relatively large spacing between the rails allows foods having a small exterior size to fall through the grate and into the fire, e.g., kabob-style foods or small vegetables. It is therefore difficult to cook small articles of food on a conventional grate without losing a portion of the food through the grate.

A solution to the aforementioned problems is disclosed in U.S. Pat. No. 3,552,302 issued to Gilberg. A thin metal plate disposed above an open fire source has a continuous rim at the periphery of the plate and a plurality of perforations disposed interiorly of the rim. The perforations may be in the form of slits including downwardly depending stiffening flanges made by stamping or cutting the thin metal plate. The slits are narrow (not more than one-tenth of an inch) and small foods may be placed on the plate without falling through the slits. The downwardly depending flanges assist in inhibiting the passage of flame through the slits. Thus, the perforated plate inhibits flames from passing therethrough and allows small foods to be placed thereon.

A perforated plate of the type disclosed in Gilberg includes disadvantages associated therewith. For example, in contrast with a conventional grate have a plurality of rails, the thin metal plate of Gilberg is not capable of supporting heavy food items if the size of the plate is relatively large. The thin metal plate must therefore be placed on top of a grate of conventional design, or supported on the bottom side by suitable supporting members. Thus, in addition to the cost associated with the bending and cutting operations during forming of the rim and perforations of the plate, further cost is incurred because of additional required supporting structure underneath the plate.

Moreover, when directly exposed to open flames, the thin metal plate has a relatively short life span when compared to more substantial structures such as the rails of a conventional grate. Thus, more frequent replacement of the plate is necessitated.

Further, a thin plate may be easily damaged by utensils such as knives or meat forks. As disclosed in Gilberg, the perforations may be formed in the plate with a wedged instrument such as a point or knife edge. Turning or cutting meat or other foods on the plate during cooking with a fork or knife may result in damage to the thin metal plate because of the formation of additional unwanted perforations. Moreover, a sharp point on a bone of a meat roast may damage the plate. Thus, a cooking grate made of a thin metal plate may be easily damaged.

Finally, the perforations formed in the plate comprise a small portion of the total surface area of the plate. Smoke and grease may have difficulty passing through the perforations because of the relatively small area through which they pass. Additionally, the majority of the food is in direct contact with the upper surface of the plate itself rather than disposed above the perforations. As a result, the majority of the surface of the food is not in direct contact with the smoke (which may be desirable for flavoring) and is heated by conduction rather than convection.

What is needed in the art is: a grate for a cooking grill which allows heat, smoke and grease to easily pass therethrough, but inhibits flames from passing therethrough; a grate which has sufficient strength to support relatively heavy foods; a grate which is not easily damaged; a grate which prevents relatively small food items from falling therethrough; and a grate which has a life span similar to a conventional grate having a plurality of rails.

SUMMARY OF THE INVENTION

The present invention provides a grate for a cooking grill having rails disposed in parallel with a maximum spacing therebetween corresponding to a common height of the rails, whereby flames from an open flame heat source or grease fire are prevented from passing through the spacings.

In general, the grate includes a plurality of parallel, closely spaced rails attached to at least two support members disposed transverse to the rails. Depending upon the particular height of the rails, a maximum spacing between the rails may be established which prevents flames from passing through the spacings. Heat, smoke and grease are allowed to pass through the grate, while flames are prevented from passing through the grate.

The invention comprises, in one form thereof, a grate for a cooking grill. The grill includes a heat source. The grate includes a plurality of support members, and a plurality of elongated rails disposed in spaced apart parallel relationship with each other and extending transversely to the support members. The spaces between the rails prevent flames from passing through the spaces.

In one embodiment of the invention, the spaces correspond to a common height of the rails. The spaces between each of the rails are the same. The common spacing is determined empirically.

An advantage of the present invention is that a grate is provided which inhibits flames from passing therethrough, and which has sufficient strength to support relatively heavy foods.

Another advantage is that the grate is not easily damaged.

Yet another advantage is that the grate prevents relatively small food items from falling therethrough.

A further advantage is that the grate has a life span similar to conventional grates having a plurality of rails.

A still further advantage is that the grate, when formed with rails have a rectangular cross section, allows easy cleaning of the upper cooking surface.

An additional advantage is that the grate has increased aesthetic appeal.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
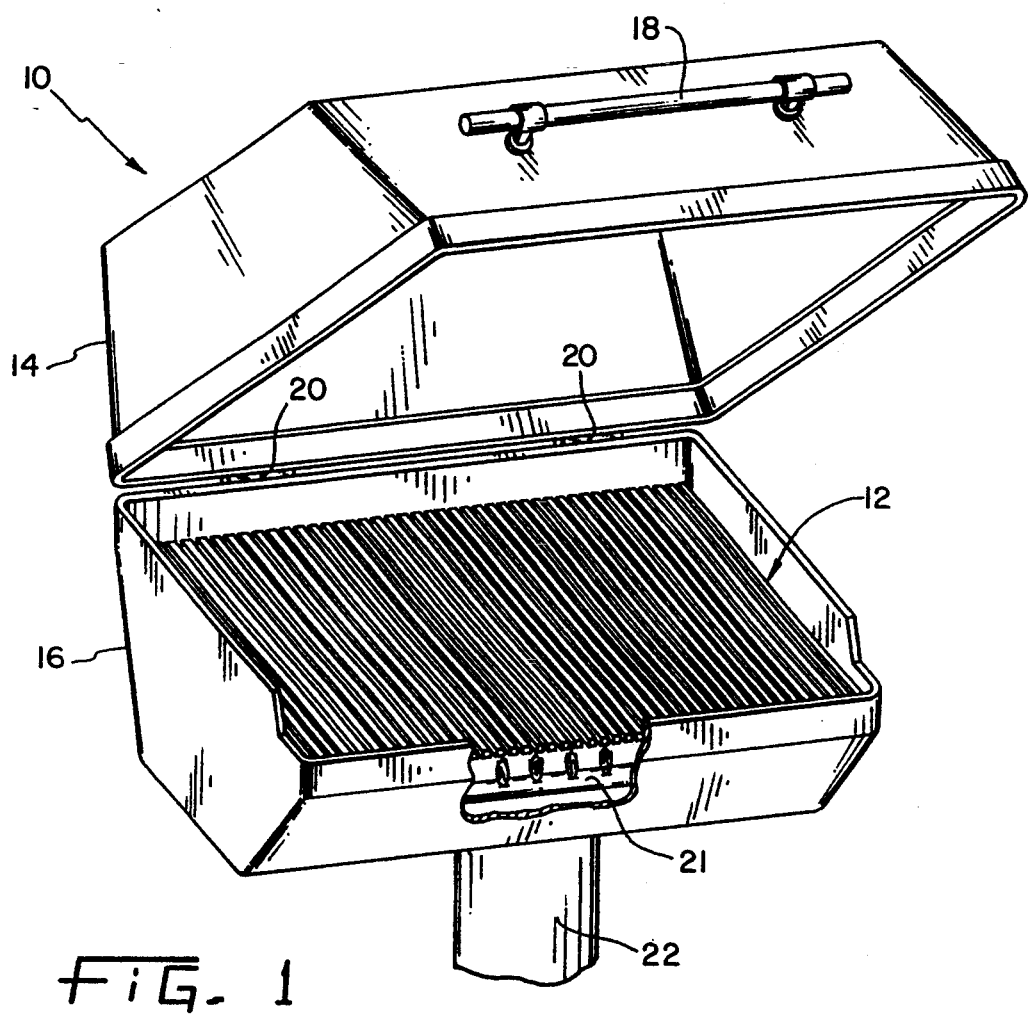
FIG. 1 is a partially broke-away perspective view of a cooking grill having a grate according to an embodiment of the present invention installed therein.

In accordance with the present invention, a cooking grill 10 of conventional design is shown with a grate 12 of the present invention installed therein. Grill 10 includes a lid 14 hingedly connected to a base 16. Lid 14 includes a handle 18 allowing a user to pivot lid 14 about hinges 20 and access the interior of grill 10. Disposed within base 16 and under grate 12 is an open flame heat source comprising a gas burner 21. Base 16 includes a pedestal 22 maintaining grill 10 in a vertical, upright position.

Figure 2:
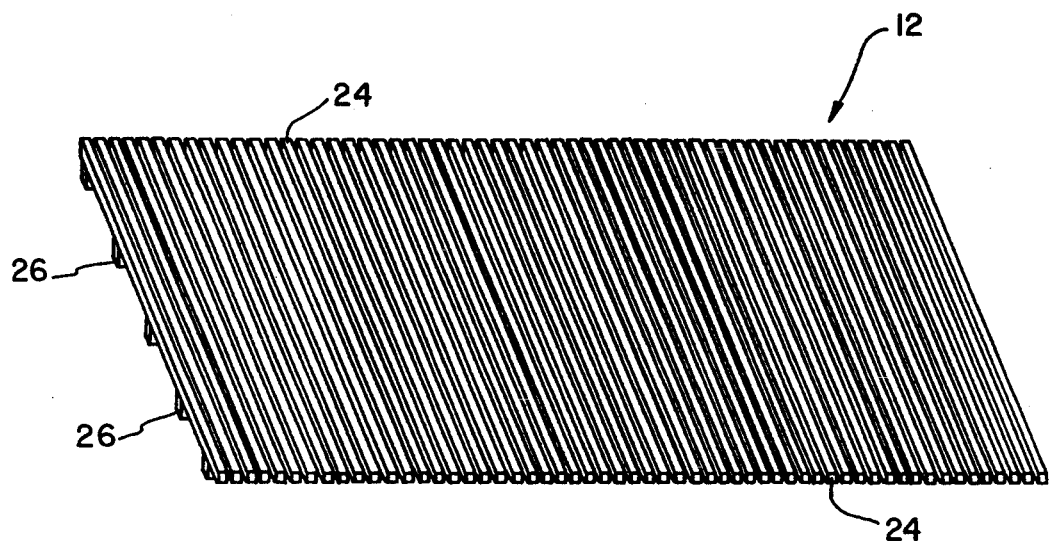
FIG. 2 is a perspective view of the grate shown in FIG. 1.
Figure 3:
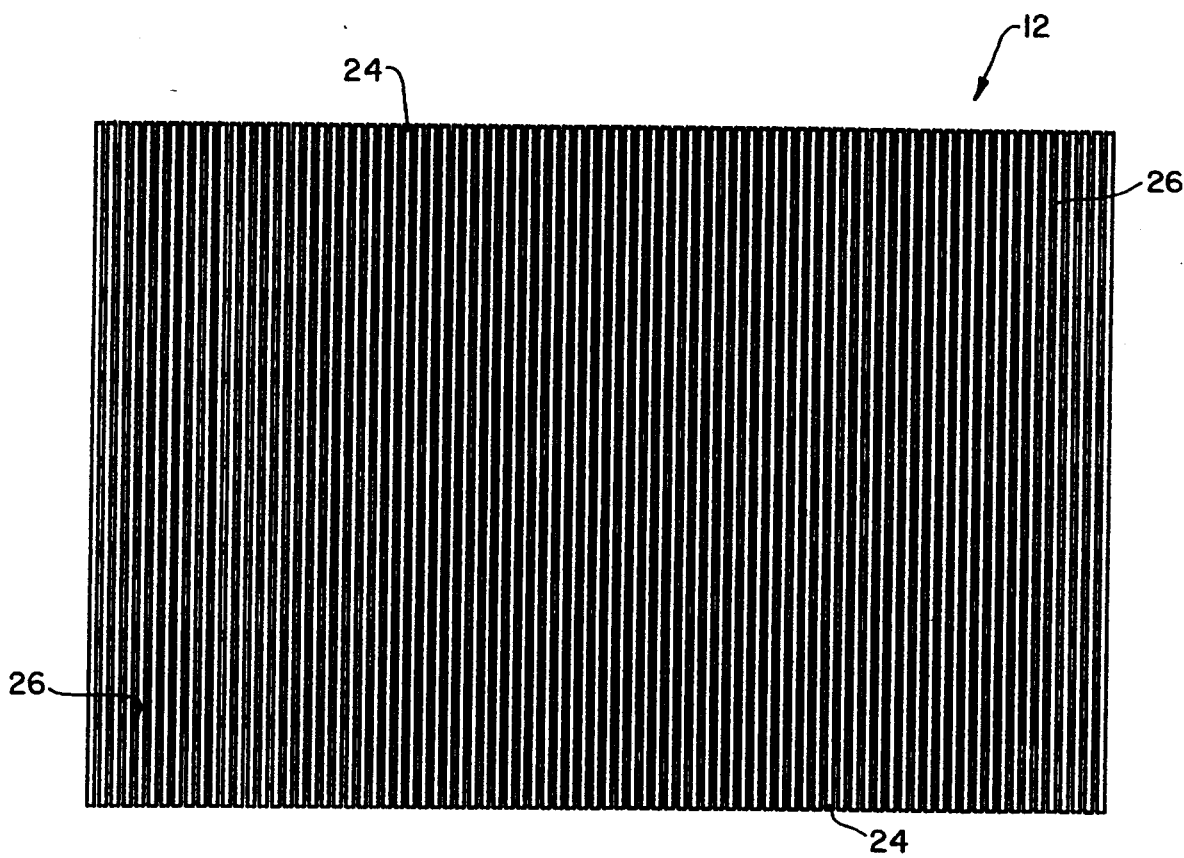
FIG. 3 is a top view of the grate of FIGS. 1 and 2.

In accordance with the present invention, and referring to FIGS. 2 and 3, grate 12 of the present invention includes a plurality of elongated rails 24 disposed in parallel side-by-side relationship with each other. A plurality of support members 26 extend transversely to and are attached to each of rails 24. In the embodiment shown, support members 26 are welded to each of rails 24. Support members 26 provide additional support to rails 24 and maintain rails 24 in parallel relationship with each other.

Figure 4:
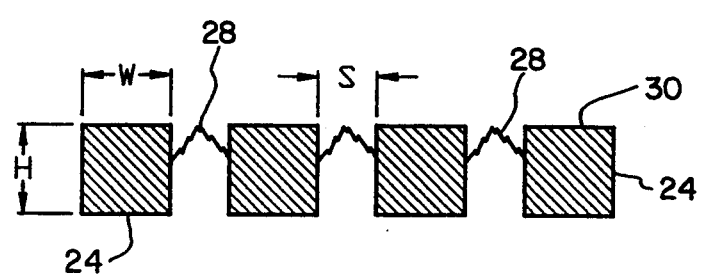
FIG. 4 is a partial front elevational view of the grate of FIGS. 2 and 3 showing a maximum spacing between the rails corresponding to a particular height of the rails.
Figure 5:
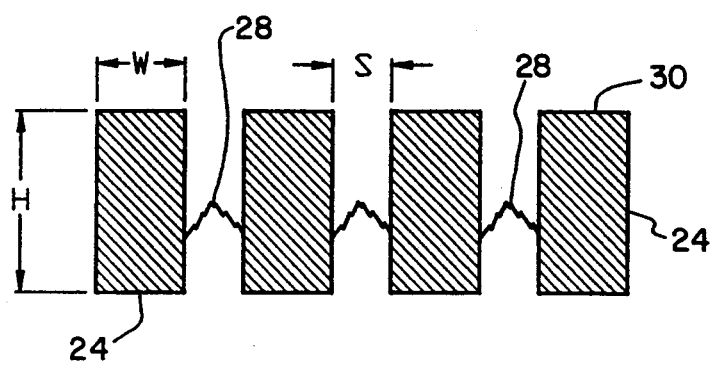
FIG. 5 is a partial front elevational view similar to FIG. 4 showing an embodiment of a grate of the present invention having a spacing between the rails less than a maximum spacing corresponding to a particular height of the rails.

Rails 24 have a rectangular cross sectional profile (FIGS. 2, 4 and 5). The spacing "S" (FIGS. 4 and 5) between adjacent rails 24 is such that flames from the open flame heat source and/or a grease fire are prevented from passing through spacings "S".

For a given height of each of rails 24, it is possible to empirically determine a maximum spacing "S" between each of the rails which will not allow flames from open flame heat source 21 and/or a grease fire to pass through spacings "S" of grate 12. The phrase "through the spacings" or "through the grate", as used in this application, means that flames cannot pass entirely through spacings "S" between each of rails 24 to extend above upper surface 30 of grate 12. Any spacing between rails 24 less than the empirically determined maximum spacing "S" corresponding to a height of rails 24 will prevent flames from passing through grate 12, while allowing heat, smoke and grease to pass through grate 12. On the other hand, for a particular common height of rails 24, a spacing between rails 24 greater than the empirically determined maximum spacing "S" will allow flames to pass through grate 12 and scorch foods being cooked thereon.

FIG. 3 illustrates one embodiment of the present invention showing a maximum spacing "S" corresponding to a particular common height of rails 24. Transverse support members 26 are not illustrated in FIGS. 4 and 5 for the sake of simplicity. Rails 24 have a height "H" and width "W". For purposes of establishing a maximum spacing "S" width "W" is of minor importance. However, width "W" may have significance for other purposes, e.g., such as ensuring adequate draft of combustion products through grate 12 if grate 12 completely overlies the heat source disposed below the grate. Maximum spacing "S" is empirically determined such that the top of flames 28 extend almost to a plane lying coincident with the upper surface 30 of rails 24. Thus, maximum spacing "S" is such that flames 28 do not directly contact food being cooked on top of rails 24. Scorching or blackening of the food is thereby inhibited. In the embodiment shown in FIG. 3, rails 24 have a height "H" and width "W" of 3/16 inch, and a spacing "S" therebetween of ⅛ inch.

FIG. 5 illustrates another embodiment of the present invention wherein spacing "S" is less than the empirically determined maximum spacing between rails 24. In the embodiment of FIG. 5, rails 24 have a width W of 3/16 inch, a height H of ⅜ inch and a spacing "S" between each of rails 24 of ⅛ inch. As shown, with such a configuration, flames 28 extend approximately half way through spacings "S", i.e., one half of the distance of height "H". Scorching or blackening of food being cooked on top of rails 24 is thereby inhibited.

In the embodiment shown in FIG. 1, grate 12 is shown disposed within a cooking grill 10 of conventional design. However, it is to be understood that grate 12 may be used in combination with other types of cooking grills, e.g., grills without lids and large roasters. Moreover, grate 12 may be placed directly on top of a grate of conventional design. Further, the heat source disposed under grate 12 may be of a different type, e.g., a bed of ignited charcoal or electric resistance type heater. Thus, grate 12 may be used in combination with any cooking apparatus wherein the possibility of an open flame from an open flame heat source and/or grease fire exists.

Moreover, in the embodiments shown in the drawings, rails 24 and support members 26 are shown having a rectangular cross sectional profile. It is to be understood, however, that rails 24 and support members 26 may be configured with different cross sectional profiles such as an oblong, circular or U-shaped profile. Furthermore, rails 24 and support members 26 may be formed as hollow members.

Support members 26 are shown in the drawings as welded to the bottom side of each of rails 24. It may also be possible to form grate 12 such that support members 26 extend between each of rails 24 acting as a spacer therebetween. Further, rather than welding support member 26 to each of rails 24, it may be possible to form rails 24 and support members 26 as a unitary assembly, e.g., using a casting process.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A grate for a cooking grill, the grill including a heat source, said grate comprising:
    a plurality of support members;
    a plurality of elongated rails having a height and width, said rails disposed in spaced apart parallel relationship with each other and extending transversely to said support members; and
    means for preventing flames from passing through said grate, said preventing means comprising a plurality of spaces respectively defined by and disposed between adjacent said rails, said spaces being less than or substantially equal to a maximum spacing, said maximum spacing dependent on the height of said rails.

2. The grate of claim 1, wherein said support members are attached to said rails.

3. The grate of claim 2, wherein said support members are welded to said rails.

4. The grate of claim 1, wherein the spaces between said rails are empirically determined dependent on the height of said rails.

5. The grate of claim 4, wherein the spaces between each of said rails are the same.

6. The grate of claim 1, wherein a said heat source is an open flame heat source.

7. The grate of claim 6, wherein said flames are produced by at least one of a said open flame heat source and a grease fire.

8. The grate of claim 1, wherein at least one of said rails and said support members are solid.

9. The grate of claim 1, wherein the height of said rails comprises about ⅜ inch and said spacing comprises about ⅛ inch.

10. The grate of claim 1, wherein said rails have a height between about 3/16 inch and ½ inch.

11. The grate of claim 1, wherein said rails have a width of about 3/16 inch.

12. The grate of claim 1, wherein said support members are disposed below said rails when said grate is in an installed position in said grill.

13. The grate of claim 1, wherein said support members and said rails comprise a unitary assembly.

14. The grate of claim 13, wherein said unitary assembly is formed by a casting process.

15. The grate of claim 1, wherein said rails have a rectangular cross sectional profile.

16. A grate for a cooking grill, the grill including a heat source, said grate comprising:
    a plurality of support members;
    a plurality of elongated rails having a height and width, said rails disposed in spaced apart parallel relationship with each other and extending transversely to said support members, each of said rails having a common height and width; and
    means for preventing flames from passing through said grate, said preventing means comprising a plurality of spaces respectively defined by and disposed between adjacent said rails, each of said spaces being substantially the same, said spaces being less than or substantially equal to a maximum spacing, said maximum spacing being dependent on the height of said rails.

17. The grate of claim 16, wherein said support members are attached to said rails.

18. The grate of claim 16, wherein the spaces between said rails are empirically determined dependent on the height of said rails.

19. The grate of claim 16, wherein said flames are produced by at least one of a said heat source and a grease fire.

20. The grate of claim 16, wherein the height of said rails comprises about ⅜ inch and said spacing comprises about ⅛ inch.

21. A grate for a cooking grill, the grill including a heat source, said grate comprising:
    a plurality of support members;
    a plurality of elongated rails having a height of between about 3/16 and ⅜ inch and disposed in spaced apart parallel relationship with each other, said rails extending transversely to said support members; and
    means for preventing flames from passing through said grate, said preventing means comprising a plurality of spaces of between about 1/16 and ¼ inch, respectively defined by and disposed between adjacent said rails.

* * * * *